United States Patent
Hakamada et al.

(10) Patent No.: US 9,505,941 B2
(45) Date of Patent: Nov. 29, 2016

(54) INK, INK CARTRIDGE, AND INKJET RECORDING METHOD

(71) Applicant: CANON KABUSHIKI KAISHA, Tokyo (JP)

(72) Inventors: Shin-ichi Hakamada, Kawasaki (JP); Daiji Okamura, Tokyo (JP); Kousuke Yamasaki, Kawasaki (JP); Yuki Nishino, Kawasaki (JP); Kenichi Shiiba, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 13/888,132

(22) Filed: May 6, 2013

(65) Prior Publication Data

US 2013/0300805 A1 Nov. 14, 2013

(30) Foreign Application Priority Data

May 9, 2012 (JP) ................................. 2012-107781

(51) Int. Cl.
 *B41J 2/21* (2006.01)
 *C09D 11/324* (2014.01)

(52) U.S. Cl.
 CPC ............ *C09D 11/324* (2013.01); *B41J 2/2107* (2013.01)

(58) Field of Classification Search
 CPC ...... B41J 2/05; B41J 2/17503; B41J 2/2107; B41J 2/01; B41J 2/0057; B41J 2/1433; B41J 2/17; B41J 2/1755; B41J 2/17593; B41J 2/21; B41J 2/211; B41J 2/2114; B41J 2/2117; B41J 2/2056; B41J 11/0015; B41J 11/002; B41J 3/60; C09D 11/324; C09D 11/38; C09D 11/005; C09D 11/30; C09D 11/32; C09D 11/322; C09D 11/328; C09D 11/36; C09D 11/40; C09D 11/52; C09D 11/54; C09D 11/101; B41M 5/011; B41M 5/0017; B41M 5/52; B41M 5/5218; B41M 7/00; B41M 7/0072; B41M 7/0081; B41M 7/009

USPC ...... 347/56, 86, 95–105, 9–22, 88; 524/100, 524/101, 130, 291; 106/31.13, 31.27, 31.6, 106/31.85, 31.77; 523/160, 161

See application file for complete search history.

(56) References Cited

U.S. PATENT DOCUMENTS

| 2003/0166742 | A1* | 9/2003 | Hirasa et al. ................. 523/160 |
| 2008/0207805 | A1 | 8/2008 | Blease |
| 2008/0292793 | A1* | 11/2008 | Yamashita et al. ........... 427/256 |
| 2008/0292794 | A1* | 11/2008 | Sato et al. .................... 427/256 |
| 2011/0143040 | A1 | 6/2011 | Yamasaki |
| 2012/0050384 | A1* | 3/2012 | Nishiguchi et al. ............ 347/20 |

(Continued)

FOREIGN PATENT DOCUMENTS

| EP | 1666550 A1 | 6/2006 |
| EP | 2423274 A1 | 2/2012 |
| JP | 2005-515289 A | 5/2005 |

(Continued)

*Primary Examiner* — Manish S Shah
(74) *Attorney, Agent, or Firm* — Canon U.S.A., Inc., IP Division (57) ABSTRACT

An ink used for an inkjet recording method for discharging the ink from a recording head by an action of thermal energy contains self-dispersing carbon black, a polyurethane polymer having an acid value of 40 mg KOH/g or more, and an acryl polymer having an acid value of 100 mg KOH/g or more and 200 mg KOH/g or less.

19 Claims, 2 Drawing Sheets

(56) References Cited

U.S. PATENT DOCUMENTS

2013/0001980 A1* 1/2013 Boivin et al. ............. 296/180.4
2013/0300804 A1* 11/2013 Okamura et al. ............... 347/56
2013/0300810 A1* 11/2013 Nishino et al. ................ 347/86

FOREIGN PATENT DOCUMENTS

| WO | 03062331 A | 7/2003 | |
|---|---|---|---|
| WO | 03062331 A1 | 7/2003 | |
| WO | WO 2011074167 A1 * | 6/2011 | ........... C09D 11/322 |

\* cited by examiner

FIG. 1

FIG. 2

INK, INK CARTRIDGE, AND INKJET RECORDING METHOD

BACKGROUND OF THE INVENTION

Field of the Invention

The present invention relates to an ink, an ink cartridge having such an ink, and an inkjet recording method using such an ink.

Description of the Related Art

In recent years, inkjet recording apparatuses have had increased opportunities to be used in business fields with enhancement of their image quality and recording speed. Performances required for the ink for inkjet used in the business field include reliability of the ink (discharge stability and the like), the image quality (high image density, feathering resistance and the like), and fastness of images (abrasion resistance, highlighter resistance, water resistance and the like). Among these performances, the inks using a self-dispersing pigment rather than a polymer-dispersing pigment to enhance an optical density of an image and further containing a polyurethane polymer to enhance the highlighter resistance on the image have been studied [Japanese Patent Application Laid-Open (Translation of PCT Application) No. 2005-515289]. In Japanese Patent Application Laid-Open No. 2005-515289, it is described that the highlighter resistance on the image is improved by an aqueous inkjet ink containing the polyurethane polymer having an acid group and the self-dispersing pigment.

SUMMARY OF THE INVENTION

Aspects of the present invention are directed to an ink that has the high discharge stability of the ink and the high highlighter resistance on the obtained image even when the recording is conducted at a high speed in an inkjet recording method in which an ink is discharged from a recording head by an action of thermal energy. The present invention is also directed to an ink cartridge having the above ink and an inkjet recording method using the above ink.

According to an aspect of the present invention, an ink used for an inkjet recording method for discharging the ink from a recording head by an action of thermal energy contains self-dispersing carbon black, a polyurethane polymer having an acid value of 40 mg KOH/g or more, and an acryl polymer having an acid value of 100 mg KOH/g or more and 200 mg KOH/g or less.

According to an exemplary embodiment of the present invention, it is possible to provide an ink having the high discharge stability of the ink and the high highlighter resistance on the obtained image. According to other exemplary embodiments of the present invention, an ink cartridge and an inkjet recording method using the ink can be provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

As a result of a study by the present inventors, it was found that when the ink described in Japanese Patent Application Laid-Open No. 2005-515289 was used for an inkjet recording method in which the ink was discharged from a recording head by giving thermal energy to the ink, the highlighter resistance on the image was high, but a sufficient discharge stability of the ink was not obtained because an acid value of the polyurethane polymer was 20 to 30 mg KOH/g, which was low.

Thus, when a polyurethane polymer having an acid value of 40 mg KOH/g or more was used as a polyurethane polymer having hydrophilicity that was high to some extent, the discharge stability of the ink was improved, and the discharge stability and the highlighter resistance were able be balanced.

The present inventors also extensively studied dispersion systems and types of the pigments in order to obtain the image with high quality as required in the business field, and found that it was important to use self-dispersing carbon black.

Then, the present inventors examined that an ink containing the self-dispersing carbon black to obtain the image with high quality and containing the polyurethane polymer having an acid value of 40 mg KOH/g or more to improve the highlighter resistance on the image was applied to the recording at a high recording speed as required in the business field. Consequently, phenomena where stripes were observed on recorded matters and images of ruled lines were distorted were observed were affirmed, and the discharge stability of the ink was reduced.

The present inventors first examined why the discharge stability of an ink was reduced when the ink containing self-dispersing carbon black and a polyurethane polymer having an acid value of 40 mg KOH/g or more was used to record at a high recording speed in the inkjet recording method in which the ink is discharged from the recording head by an action of thermal energy (hereinafter, also referred to as a "thermal inkjet recording method").

The present inventors observed a heater board of the recording head under an optical microscope after recording at a high speed using the ink containing the self-dispersing carbon black and the polyurethane polymer having an acid value of 40 mg KOH/g or more in the thermal inkjet recording method, and it was found that the decomposed pigment and polyurethane polymer were deposited on the heater board. It was also found that these adhered depositions can also occur upon recording at an ordinary recording speed but a discharge speed of the ink was reduced only when recording at a high speed. This mechanism is shown below.

A discharge direction of an ink droplet is influenced by a discharge speed of the ink droplet and a recording speed, i.e., a moving speed of a carriage. When the discharge speed of the ink droplet is sufficiently high, the influence given by the moving speed of the carriage is negligible. Thus, the ink droplet is discharged in a direction perpendicular to a discharge port surface. However, when the discharge speed of the ink droplet is low, the influence by the moving speed of the carriage is given, and the discharge direction of the ink droplet shifts from the direction perpendicular to the discharge port surface. As described above, when the pigments and the polyurethane polymer are deposited on the heater board, the energy upon discharge the ink is weakened and the discharge speed of the ink is reduced. Thus, when the recording is conducted at a higher moving speed of the carriage than a conventional speed, the discharge direction of the ink droplet prominently shifts from an intended direction, and this phenomenon is recognized by the phenomena where the stripes were observed on the recorded matters and the images of the ruled lines strain.

Subsequently, the present inventors studied a cause why the deposition occurs on the heater board and a method of solving it as follows.

The present inventors prepared inks A to B containing polymers (polyurethane polymer having an acid value of 40 mg KOH/g or more and acryl polymer having an acid value of 40 mg KOH/g or more) and pigments (self-dispersing carbon black and self-dispersing organic pigment) in combination shown in Table 1. An ink cartridge was filled with these inks, and mounted in an inkjet recording apparatus, PIXUS iP3100 (manufactured by Canon Inc.), which discharged the ink from the recording head by giving thermal energy to the ink, in which the moving speed of the carriage had been modified to become 2 times. Then, images were recorded on recording media. The heater board of the recording head was observed on the optical microscope after recording the images.

TABLE 1

Preparation condition of inks A to E

| Ink No. | Polymer | | Pigment | |
|---|---|---|---|---|
| | Polyurethane polymer having acid value of 40 mg KOH/g or more | Acryl polymer having acid value of 40 mg KOH/g or more*[1] | Self-dispersing carbon black | Self-dispersing organic pigment*[2] |
| Ink A | Presence | — | — | — |
| Ink B | — | — | Presence | — |
| Ink C | Presence | — | Presence | — |
| Ink D | — | Presence | Presence | — |
| Ink E | Presence | — | — | Presence |

Joncryl 683 (manufactured by BASF; styrene acrylic copolymer)
Cab-O-Jet260M (manufactured by Cabot; magenta pigment)

The inks A to C had the following results. In the case of the ink A, no decomposed polyurethane polymer was observed on the heater board. In the case of the ink B, although carbon black was adhered onto the heater board, no phenomenon where the stripes were observed on the recorded matters and the images of the ruled lines strain was confirmed. On the other hand, in the case of the ink C, not only carbon black but also the polyurethane polymer was deposited on the heater board. Further, an amount of deposited carbon black on the heater board was larger than in the case of the ink B. Concerning why the inks are different in adhered/deposited matters on the heater board of the recording head and discharge stability of the ink, the present inventors have speculated as follows.

When the thermal energy is given to the ink containing the self-dispersing carbon black, the carbon black itself having a very high thermal decomposition temperature is not decomposed, but a part of a compound having a hydrophilic group that contributes to the dispersion of the carbon black is decomposed. Thus the carbon black loses hydrophilicity and adheres to the heater board. Subsequently, each time when the ink is discharged, the carbon black that lost the hydrophilicity occurs. At that time, in the case of the ink B, the carbon black that lost the hydrophilicity is not deposited anymore on the carbon black adhered to the heater board, and discharged together with the ink. This is believed to be because a cohesive force of the carbon black one another in the ink B is not stronger than a cohesive force between the heater board and the carbon black. Therefore, in the case of the ink B, the carbon black adheres to only the surface of the heater board, but is not deposited anymore, and gives no large effect on the discharge speed of the ink droplet. Thus, the discharge stability of the ink is not reduced.

In the case of the ink C, it was found that the carbon black that had lost the hydrophilicity was not discharged together with the ink and was deposited on the carbon black adhered to the heater board. This is believed to be because the cohesive force of the carbon black one another is enhanced by the polyurethane polymer adsorbed onto the surface of the carbon black. It is thought that the discharge speed of the ink droplet is reduced and the discharge stability of the ink is reduced by the carbon black and the polyurethane polymer deposited as above.

Meanwhile, the inks D and E had the following results. In the case of the ink D, just like the case of the ink B, although the carbon black was adhered onto the surface of the heater board, a decomposed acryl polymer was not confirmed. In the case of the ink E, just like the case of the ink A, the pigment and the polyurethane polymer were not confirmed to be adhered and deposited on the heater board. Thus, in the inks D and E, no phenomenon where the stripes were observed on the recorder matters and the images of the ruled lines strained was confirmed.

The ink D contains the carbon black, and thus the carbon black that lost the hydrophilicity adheres onto the heater board. The acryl polymer adsorbs to the surface of the carbon black, but has a weaker action to cohere the carbon black one another than the polyurethane polymer in the ink C. This difference is believed to be due to the difference of viscosity that the polymers have. The polyurethane polymer has a strong intermolecular interaction by a hydrogen bond between a hydrogen atom and a nitrogen atom. Thus, the polyurethane polymer has the higher viscosity than the acryl polymer. As a result from above, in the ink D, the carbon black that lost the hydrophilicity is not deposited anymore on the carbon black adhered onto the heater board, and is discharged together with the ink.

The ink E contains the organic pigment. The thermal decomposition temperature of the organic pigment is lower than that of the carbon black. Thus, when the thermal energy is given to the ink, the organic pigment is partially decomposed. A size of the decomposed organic pigment is very small. Thus, the decomposed organic pigment is discharged together with the ink, and not even adhered onto the heater board of the recording head.

From the above results, it was found that the technical problem that the discharge stability of the ink was reduced occurred when the ink containing both the polyurethane polymer having an acid value of 40 KOH/g or more and the self-dispersing carbon black like the ink C was discharged by the thermal inkjet recording method.

Thus, as a result of the study, the present inventors led to the configuration of the present invention that the acryl polymer having an acid value of 100 mg KOH/g or more and 200 mg KOH/g or less is further contained in the ink containing both the polyurethane polymer having an acid value of 40 KOH/g or more and the self-dispersing carbon black. A mechanism in which the effect is obtained by this configuration is described in detail below.

As described above, the polyurethane polymer causes the technical problem that the discharge stability of the ink is reduced by cohering the carbon black one another with its high viscosity to deposit on the heater board. As a result of the study by the present inventors, when the acryl polymer is further contained in such an ink, not only the polyurethane polymer but also the acryl polymer that has the lower viscosity than the polyurethane polymer is adsorbed to the carbon black. Thus, the action of the polyurethane polymer to cohere the carbon black is weakened. As a result, it is thought that the carbon black that lost the hydrophilicity is not deposited anymore onto the carbon black adhered onto the heater board and is discharged together with the ink, therefore, the discharge speed of the ink droplet is not greatly influenced, and the discharge stability of the ink is not reduced. Further, as another action, the acryl polymer is more soluble in water than a urethane polymer. Thus, it is possible to increase solubility of the carbon itself by physically adsorbing this polymer to the surface of the carbon. As a result, the deposition of carbon is inhibited. When the acid value of the acryl polymer is smaller than 100 mg KOH/g, the acryl polymer is easily adsorbed to the carbon black, but its hydrophilicity is low. Thus, its action to reduce the viscosity of the polyurethane polymer is weak and the discharge stability of the ink is low in this case. When the acid value is larger than 200 mg KOH/g, a sufficient amount of the acryl polymer is not adsorbed to the carbon black because its hydrophilicity is high. Its action to reduce the viscosity of the polyurethane polymer is weak and the discharge stability of the ink is low also in this case.

As in the above mechanism, each configuration synergistically interacts, thereby becoming capable of accomplishing the effect of the present invention.

[Ink]

Each ingredient that composes the ink according to exemplary embodiments of the present invention will be described below.

<Polyurethane Polymer>

The polyurethane polymer used in the ink according to exemplary embodiments of the present invention will be described in detail below.

(Polyisocyanate)

In the present exemplary embodiment, the polyurethane polymer desirably has a unit derived from polyisocyanate. "Polyisocyanate" in the present exemplary embodiment means a compound having two or more isocyanate groups. Polyisocyanate that can be used in the present exemplary embodiment specifically includes aliphatic polyisocyanate, alicyclic polyisocyanate, aromatic polyisocyanate, and aromatic aliphatic polyisocyanate. A percentage (% by mass) of the unit derived from polyisocyanate occupied in the polyurethane polymer is desirably 10% by mass or more and 80% by mass or less.

Aliphatic polyisocyanate includes tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Alicyclic polyisocyanate includes isophorone diisocyanate, hydrogenated xylylene diisocyanate, dicyclohexylmethane 4,4'-diisocyanate, 1,4-cyclohexane diisocyanate, methyl cyclohexylene diisocyanate, and 1,3-bis(isocyanate methyl)cyclohexane. Aromatic polyisocyanate includes tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Aromatic aliphatic polyisocyanate includes dialkyl diphenylmethane diisocyanate, tetraalkyl diphenylmethane diisocyanate, and $\alpha,\alpha,\alpha,\alpha$-tetramethyl xylylene diisocyanate. These polyisocyanates can be used alone or in combination of two or more as needed. In the present exemplary embodiment, it is desirable to use at least one selected from isophorone diisocyanate, hexamethylene diisocyanate, and dicyclohexylmethane 4,4'-diisocyanate among the above polyisocyanates.

(Polyol)

The polyurethane polymer used in the ink of the present exemplary embodiment desirably has a unit derived from polyol. "Polyol" in the present exemplary embodiment means a compound having two or more hydroxyl groups. Polyol includes polyester polyol, polyether polyol, polyether polyol, polycarbonate diol, and other polyols (e.g., polyhydroxy polyacetal, polyhydroxy polyacrylate, polyhydroxy polyester amide, polyhydroxy polythioether). These polyols can be used alone or in combination of two or more as needed. In the present exemplary embodiment, polyol desirably has 10 or more carbon atoms. It is also desirable to have no acid group in the molecule. A number average molecular weight of polyol is desirably 600 or more and 4,000 or less. When the number average molecular weight is less than 600, flexibility of a membrane becomes low and the highlighter resistance of the image is not sufficiently enhanced in some cases. When it is more than 4,000, the flexibility of the membrane becomes excessively high and the highlighter resistance of the image is not sufficiently enhanced in some cases.

Polyester polyol includes, for example, esters of an acid ingredient with polyalkylene glycol, bivalent alcohol or polyvalent alcohol such as trivalent or more alcohol. The acid ingredient that composes polyester polyol includes aromatic dicarboxylic acids, alicyclic dicarboxylic acids, and aliphatic dicarboxylic acids. The aromatic dicarboxylic acids include an isophthalic acid, a terephthalic acid, an orthophthalic acid, a naphthalene dicarboxylic acid, biphenyl dicarboxylic acid and a tetrahydrophthalic acid. The alicyclic dicarboxylic acid includes hydrogenated products of the aromatic dicarboxylic acids. The aliphatic dicarboxylic acid includes a malonic acid, a succinic acid, a tartaric acid, an oxalic acid, a glutaric acid, an adipic acid, a pimelic acid, a suberic acid, an azelaic acid, a sebacic acid, an alkylsuccinic acid, a maleic acid, a fumaric acid, a mesaconic acid, a citraconic acid, and an itaconic acid. Reactive derivatives thereof such as acid anhydrides alkyl esters and acid halides of these acid ingredients can also be used as the acid ingredient that composes the polyester polyol. The above acid ingredient that composes polyester polyol can be used alone or in combination of two or more as needed.

Meanwhile, the polyalkylene glycol includes polyethylene glycol, polypropylene glycol, polytetramethylene glycol, and ethylene glycol/propylene glycol copolymers. The bivalent alcohol includes hexamethylene glycol, tetramethylene glycol, ethylene glycol, diethylene glycol, propylene glycol, dipropylene glycol, 1,3-butanediol, 1,4-butanediol, 4,4-dihydroxydiphenylpropane, and 4,4-dihydroxyphenylmethane. The polyvalent alcohol such as trivalent or more alcohol includes glycerin, trimethylolpropane, 1,2,5-hexanetriol, 1,2,6-hexanetriol and pentaerythritol. These polyester polyol can be used alone or in combination of two or more as needed.

Polyether polyol includes, for example, polyalkylene glycol and addition polymerized products of alkylene oxide and bivalent alcohol or polyvalent alcohol such as trivalent or more alcohol. The alkylene oxide includes ethylene oxide, propylene oxide, butylene oxide and α-olefin oxide. The polyalkylene glycol, bivalent alcohol or polyvalent alcohol such as trivalent or more alcohol includes those exemplified as the ingredients that compose the polyester polyol. These polyether polyol can be used alone or in combination of two or more as needed.

Polycarbonate diol produced by known methods can be used as polycarbonate diol. For example, polyhexamethylene carbonate diol that is hexanediol-based polycarbonate diol is included. Polycarbonate diol obtained by reacting a carbonate ingredient such as alkylene carbonate, diaryl carbonate and dialkyl carbonate or a phosgene with an aliphatic diol ingredient is included. These polycarbonate diol can be used alone or in combination of two or more as needed.

In the present exemplary embodiment, it is desirable to use polyether polyol particularly among the polyols. The flexibility of the polyurethane polymer is appropriately elicited by using polyether polyol. Thus the highlighter resistance of the image is enhanced. Further, polyether polyol is relatively highly soluble in water, and thus is excellent in discharge stability of the ink. It is particularly desirable to use polypropylene glycol among polyether polyols. It was confirmed by the study by the present inventors that when polypropylene glycol is used, the water solubility of the polyurethane polymer was enhanced and the discharge stability of the ink was further improved. The percentage (% by mass) of the unit derived from polyol occupied in the polyurethane polymer is desirably 5.0% by mass or more and 60% by mass or less.

(Diol Having Acid Group)

The polyurethane polymer used in the ink of the present exemplary embodiment desirably has a unit derived from diol having an acid group. "Diol having the acid group" in the present exemplary embodiment means diol having the acid group such as a carboxyl group, a sulfonate group and a phosphate group. In the present exemplary embodiment, diol having the acid group desirably has carbon atoms of less than 10. Diol having the acid group may be present in the form of an alkali metal salt with Li, Na, K or the like or an organic amine salt with ammonia, dimethylamine or the like. It is desirable to use dimethylol propionate and dimethylol butanoate. These may be used alone or in combination of two or more as needed. The percentage (% by mass) of the unit derived from diol having the acid group, which is occupied in the polyurethane polymer is desirably 5.0% by mass or more and 40.0% by mass or more.

(Chain Extender)

In the present exemplary embodiment, a chain extender may be used when the polyurethane polymer is synthesized. The chain extender is a compound that reacts with a remaining isocyanate group that did not form a urethane bond among polyisocyanate unit in a urethane prepolymer. The chain extender includes, for example, trimethylol melamine and derivative thereof, dimethylol urea and derivative thereof, polyvalent amine compounds such as dimethylol ethylamine, diethanol methylamine, dipropanol ethylamine, dibutanol ethylamine, ethylenediamine, propylenediamine, hexylenediamine, triethylene tetramine, tetraethylene pentamine, isophorone diamine, xylylene diamine, diphenylmethane diamine, hydrogenated diphenylmethane diamine, and hydrazine; polyamide polyamine, and polyethylene polyimine. The chain extender also includes ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane and pentaerythritol. These chain extenders can be used alone or in combination of two or more as needed.

(Characteristics of Polyurethane Polymer)

In the present exemplary embodiment, the acid value of the polyurethane is necessary to be 40 mg KOH/g or more as described above. Further, the acid value is desirably 140 mg KOH/g or less. When the acid value is larger than 140 mg KOH/g, the polyurethane polymer becomes rigid and the highlighter resistance of the image is not sufficiently enhanced in some cases.

In the present exemplary embodiment, a content (% by mass) of the polyurethane polymer is desirably 0.1% by mass or more and 10.0% by mass or less, and more desirably 0.5% by mass or more and 1.5% by mass or less based on a total mass of the ink. The highlighter resistance of the image can be obtained at high level by making the content 0.5% by mass or more. The discharge stability of the ink is also obtained at high level by making the content 1.5% by mass or less.

The content (% by mass) of the polyurethane polymer in the ink is desirably 0.05 times or more and 2.00 times or less and more desirably 0.1 time or more and 0.4 times or less as a mass ratio relative to the content (% by mass) of the pigment based on the total mass of the ink. The highlighter resistance of the image is obtained at high level by making the mass ratio 0.1 time or more. The discharge stability of the ink is obtained at high level by making the mass ratio 0.4 times or less.

A weight average molecular weight (Mw) in terms of polystyrene obtained by GPC in the polyurethane polymer used in the ink of the present exemplary embodiment is desirably more than 30,000 and 150,000 or less. When the weight average molecular weight is 30,000 or less, strength of the polyurethane polymer becomes low and the highlighter resistance of the image is sufficiently enhanced in some cases. When it is more than 150,000, the viscosity of the ink easily increases and the discharge stability of the ink is not sufficiently enhanced in some cases.

(Method of Synthesizing Polyurethane Polymer)

Any method used conventionally and generally can be used as a method of synthesizing the polyurethane polymer in the present exemplary embodiment. For example, the following method is included. Polyisocyanate, polyol having no acid group and diol having the acid group are reacted to synthesize a urethane prepolymer having an isocyanate group at a molecular end. Subsequently, the acid group in the above urethane prepolymer is neutralized by a neutralizing agent. Then, this neutralized urethane prepolymer is added to an aqueous solution containing a chain extender and reacted therewith. Subsequently, when an organic solvent is contained in the system, it can be removed to obtain the polyurethane polymer.

(Method of Analyzing Polyurethane Polymer)

The polyurethane polymer can be analyzed by a state of the ink, but the accuracy is further enhanced by extracting the polyurethane polymer. Specifically, a sample obtained by centrifuging the ink at 80,000 rpm, precipitating a solution other than a solid content with an acid such as a hydrochloric acid, and drying the precipitate is used. The polyurethane resin is contained in this sample. Thus, a composition, the acid value and the molecular weight of the polyurethane polymer can be analyzed using this sample by the following method.

(1) Composition of Polyurethane Polymer

The composition of the polyurethane polymer (types of polyisocyanate, polyether polyol having no acid group and diol having the acid group) can be identified by peak positions of chemical shift obtained by dissolving the sample obtained above in deuterated dimethylsulfoxide (deuterated DMSO) and measuring the solution using a proton nuclear magnetic resonance method ($^1$H-NMR) and by measuring the sample obtained above by thermal decomposition gas chromatography. Further, a composition ratio can be calculated from a ratio of integrated values of the peaks in the chemical shift. A repeating number of polyether polyol having no acid group can be calculated and its number average molecular weight can be calculated by dissolving the sample obtained above in deuterated DMSO and measuring the solution by a carbon nuclear magnetic resonance method ($^{13}$C-NMR).

(2) Method of Measuring Acid Value of Polyurethane Polymer

The acid value of the polyurethane polymer can be measured by a titration method. In Example described below, the acid value was determined by dissolving the polymer in THF and titrating a potential difference by a potassium hydroxide ethanol titration solution using a potential difference automatic titration apparatus AT 510 (manufactured by Kyoto Electronics Manufacturing Co., Ltd.).

(3) Method of Measuring Average Molecular Weight of Polyurethane Polymer

A weight average molecular weight of the polyurethane polymer can be measured by GPC. In Example described below, the weight average molecular weight was calculated by performing GPC measurement using an apparatus: Alliance GPC 2695 (manufactured by Waters), a column: Sephadex KF-806M quadruplicate column (manufactured by Showa Denko K.K.) and a detector: R1 (refractive index) and using PS-1 and PS-2 (manufactured by Polymer Laboratories) as polystyrene standard samples.

<Acryl Polymer>

The ink of the present exemplary embodiment contains the acryl polymer having an acid value of 100 mg KOH/g or more and 200 mg KOH/g or less. The acid value of the acryl polymer was measured by the same manner as in the acid value of the polyurethane polymer. Hereinafter, the terms "(meth)acrylic acid" and "(meth)acrylate" indicate "acrylic acid and methacrylic acid" and "acrylate and methacrylate", respectively.

In the present exemplary embodiment, the "acryl polymer" is a polymer obtained using (meth)acrylic acid and alkyl (meth)acrylate ester as monomers. In the present exemplary embodiment, the acryl polymer may be a copolymer of the (meth)acrylic acid and alkyl (meth)acrylate ester with the other monomer(s). Any known monomer can be used as the other monomer copolymerized with the (meth)acrylic acid and alkyl (meth)acrylate ester. Among them, α,β-ethylenic unsaturated compounds having an aryl group such as styrene, α-methylstyrene, vinyl phenylacetate, benzyl (meth)acrylate, and 2-phenoxyethyl (meth)acrylate are desirable. When the acryl polymer is a copolymer, the copolymer may be a random copolymer or a block copolymer. In the present exemplary embodiment, it is desirable to use a copolymer of the (meth)acrylic acid, alkyl (meth)acrylate ester and styrene.

In the present exemplary embodiment, the weight average molecular weight in terms of polystyrene obtained by GPC of the acryl polymer is desirably 3,000 or more and 10,000 or less. The weight average molecular weight of the acryl polymer was measured in the same manner as in the case of the acid value of the polyurethane polymer.

The content (% by mass) of the acryl polymer is desirably 0.5% by weight or more and 3.0% by mass or less, and more desirably 1.0% by mass or more and 2.4% by mass or less.

In the present exemplary embodiment, as described above, the polyurethane polymer is contained in the ink in order to enhance the highlighter resistance of the image. However, in order to enhance the discharge stability, it is important to replace a part of the polyurethane polymer adsorbed to the self-dispersing carbon black with the acryl polymer. That is, to balance the highlighter resistance of the image and the discharge stability of the ink, it is desirable to control a content ratio of the polyurethane polymer and the acryl polymer.

The content (% by mass) of the acryl polymer in the ink is desirably 0.5 time or more and 2.0 times or less as the mass ratio relative to the content of the polyurethane polymer based on the total mass of the ink. By making the mass ratio 0.5 time or more, it becomes possible to weaken the cohesive force of carbon black one another by the polyurethane polymer. Thus, the higher discharge stability is obtained. On the other hand, when the mass ratio is more than 2.0 times, the amount of the polyurethane polymer adsorbed to the self-dispersing carbon black is reduced. Thus, the highlighter resistance of the image is not sufficiently enhanced in some cases.

<Self-Dispersing Carbon Black>

In the present exemplary embodiment, the self-dispersing carbon black includes those in which a hydrophilic group is bound to the surface of the carbon black directly or via another atomic group. The hydrophilic groups in the ink may be partially dissociated or entirely dissociated.

In the present exemplary embodiment, it is verified as follows whether the carbon black contained in the ink is self-dispersing or not. Specifically, the ink is precipitated with an acid and then centrifuged to collect a precipitate. In the case of a pigment dispersion, the pigment dispersion is precipitated with the acid, and a precipitate is collected. The collected precipitate is placed in a petri dish, water is added thereto, and the precipitate is dispersed again by stirring. After leaving stand for one day, if no precipitate occurs in the petri dish and the pigment is dispersed, then the carbon black is determined to be self-dispersing.

In the present exemplary embodiment, the content (% by mass) of the carbon black in the ink is desirably 0.1% by mass or more and 15.0% by mass or less and more desirably 1.0% by mass or more and 10.0% by mass or less based on the total mass of the ink.

In the present exemplary embodiment, an average particle diameter (average particle diameter based on volume $D_{50}$) of the carbon black used in the ink is desirably 50 nm or more and 150 nm or less. In Example described below, the average particle diameter was measured using Microtrack UPA-EX50 (manufactured by Nikkiso Co., Ltd.).

Any carbon black used conventionally and generally in the ink for the inkjet can be used as the carbon black used in the ink used in the present exemplary embodiment. Specifically examples thereof include furnace black, acetylene black, channel black, thermal black, and lamp black. More specifically, it is possible to use the following commercially available carbon blacks: Raven: 7000, 5750, 5250, 5000ULTRA, 3500, 2000, 1500, 1255, 1250, 1200, 1190ULTRA-II, 1170 (manufactured by Colombia); Monac: 700, 800, 880, 900, 1000, 1100, 1300, 1400, 2000 (manufactured by Cabot); Black Pearls: 880, 800, L (manufactured by Cabot); Color Black FW1, FW2, FW2V, FW18, FW200, 5150, 5160, S170 (manufactured by Degussa); Printex 85, 95, 140U, 140V, U, V (manufactured by Degussa); Special Black: 6, 5, 4A, 4 (manufactured by Degussa); and No. 900, No. 1000, No. 220B, No. 2300, No. 2350, No. 2400R, MCF-88 (manufactured by Mitsubishi Chemical Corporation). Carbon black newly prepared for the present exemplary embodiment can of course be used.

In the present exemplary embodiment, the hydrophilic group chemically bound to the surface of the carbon black directly or via another atomic group includes, for example, COOM, $SO_3M$, $PO_3HM$, $PO_3M_2$, $SO_2NH_2$ and $SO_2NHCOR$ groups. In the above formulae, M represents a hydrogen atom, an alkali metal, ammonium, or organic ammonium.

A method of binding the hydrophilic group to the surface of the carbon black includes a method of oxidization-treating the carbon black with sodium hypochlorite, a method of oxidizing the carbon black by the treatment with ozone in water, and a method of modifying the surface of the carbon black by treating with ozone followed by giving a wet oxidization with an oxidant.

According to the study by the present inventors, it was found that it was desirable to adsorb the acryl polymer in a more amount to the surface of the carbon black in order to enhance the discharge stability of the ink containing the polyurethane polymer. Specifically, a method of adsorbing the acryl polymer in a more amount to the surface of the carbon black includes a method of using the acryl polymer having the small acid value and a method of reducing the number of hydrophilic groups bound to the surface of the carbon black. A hydrophilic group typified by a phthalate group and having two or more COOM groups to one atomic group R1 and a phosphonate group such as $PO_3HM$ and $PO_3M_2$ groups are more desirable than the other hydrophilic groups because the number of hydrophilic groups bound to the surface of the carbon black can be reduced. Among them, the phosphonate groups such as $PO_3HM$ and $PO_3M_2$ groups are particularly desirable. The hydrophilic groups bound to the atomic group R1 may be two or more. For example, the combination of COOM group and $PO_3M_2$ group and the combination of $SO_3M$ group and $PO_3M_2$ group are included.

It can be verified by an ICP luminescence analysis apparatus whether the hydrophilic group in the self-dispersing carbon black is the phosphonate group or not. Specifically, if a phosphorus element is identified using the ICP luminescence analysis apparatus, it is determined that the carbon black has the phosphonate group. Further, the phosphonate group desirably has a structure of —$CQ(PO_3M_2)_2$. In this formula, Q represents a hydrogen atom, R', OR', SR' or $NR'_2$, and R' each independently represents a hydrogen atom, an alkyl group, an acyl group, an aralkyl group, or an aryl group. When R' is a group containing carbon atoms, the group desirably contains 1 to 18 carbon atoms. Specifically, the alkyl group includes methyl, ethyl and the like; the acyl group includes acetyl, benzoyl and the like; the aralkyl group includes benzyl and the like; and the aryl group includes phenyl, naphthyl and the like. In the present exemplary embodiment, —$CH(PO_3M_2)_2$ where R' is the hydrogen atom is particularly desirable among them. The other atomic groups (—R—) include an amide group, an amino group, a ketone group, an ester group, an ether group, an alkylene group having 1 to 12 carbon atoms, a substituted or unsubstituted phenylene group, or a substituted or unsubstituted naphthylene group, and the like. Studying by the present invention, the molecular weight of —R— is desirably 1,000 or less. In the present exemplary embodiment, —R— desirably contains a benzamide group (—$C_6H_4$—CONH—) among them. Also in the present exemplary embodiment, a plurality of phosphonate groups may be bound to the carbon atom of the other atomic group (—R—). Specifically, the self-dispersing carbon black, the surface of which a bisphosphonate group or a triphosphonate group has been bound to via the atomic group is included. Among them, the self-dispersing carbon black to which the bisphosphonate group has been bound via the atomic group is desirable in terms of optical density of the image.

The present inventors further studied. When the self-dispersing carbon black to which the hydrophilic group having two or more COOM groups via one atomic group R1 has been bound is used, a surface charge amount is desirably 0.60 mmol/g or less and more desirably 0.41 mmol/g or less. When the self-dispersing carbon black to which the bisphosphonate group has been bound via the atomic group is used, the surface charge amount is desirably 0.60 mmol/g or less and more desirably 0.38 mmol/g or less. The self-dispersing carbon black to which the bisphosphonate group has been bound via the atomic group is more desirable than the self-dispersing carbon black to which the hydrophilic group having two or more COOM groups via one atomic group R1 has been bound because the stability of the dispersion can be kept with the less surface charge amount. When the surface charge amount is too low, a dispersed state of the pigment becomes instable, and the storage stability of the ink is not sufficiently obtained in some cases. Thus, the surface charge amount is desirably 0.10 mmol/g or more. In the present exemplary embodiment, the surface charge amount of the self-dispersing carbon black is obtained by colloid titration. In Example described below, the surface charge amount of the pigment in the pigment dispersion was determined by the colloid titration utilizing the potential difference using the potential difference automatic titration apparatus (AT 510 manufactured by Kyoto Electronics Manufacturing Co., Ltd.) in which a fluid potential titration unit (PCD-500) was mounted. At that time, methyl glycol chitosan was used as a titration reagent. It is also of course possible to measure the surface charge amount using the pigment extracted from the ink by an appropriate method. Also if necessary, a pigment concentration in the ink may be adjusted with water.

<Water-Soluble Organic Compound>

The ink in the present exemplary embodiment can contain a water-soluble organic compound. The content (% by mass) of the water-soluble organic compound in the ink is desirably 3.0% by mass or more and 50.0% by mass or less based on the total mass of the ink. The water-soluble organic compound may be a liquid or a solid at ambient temperature, and any one conventionally and generally used can be used. For example, the water-soluble organic compound may include alcohols, glycols, alkylene glycols where the alkylene group has 2 to 6 carbon atoms, polyethylene glycols, nitrogen-containing compounds and sulfur-containing compounds. These water-soluble organic compounds can be used alone or in combination of two or more as needed. In the present exemplary embodiment, it is desirable to use polyethylene glycol among the water-soluble organic compounds.

(Polyethylene Glycol)

In the present exemplary embodiment, as described above, the technical problem that the discharge speed of the ink is reduced is caused by allowing the self-dispersing carbon black particles to cohere one another which are adhered onto the heater surface of the recording head due to the high viscosity with the intermolecular interaction of the polyurethane polymer. According to the study by the present inventors, it was found that when polyethylene glycol was further contained in the ink, the action of the polyurethane polymer to allow the carbon black particles to cohere one another was weakened. This is because oxygen atoms in the polyethylene glycol are bound to hydrogen atoms in the polyurethane polymer to make hydrogen bonds, thereby weakening the intermolecular interaction of the polyurethane polymer to reduce the viscosity of the polyurethane polymer. Therefore, even if the polyurethane polymer is present, the cohesive force of the carbon black particles one another that lost the hydrophilic group is not increased. As a result, the carbon black and the decomposed polymer are not accumulated on the heater and it becomes possible to keep the stable discharge speed. Therefore, in the present exemplary embodiment, it is desirable to further use polyethylene glycol.

In the present exemplary embodiment, in terms of discharge stability of the ink, the content (% by mass) of polyethylene glycol in the ink is desirably 0.1 time or more and 2.0 times or less as the mass ratio relative to the content (% by mass) of the polyurethane polymer based on the total mass of the ink. The number average molecular weight of polyethylene glycol is desirably 500 or more and 3,000 or less. The number average molecular weight of polyethylene glycol can be determined by calculating the repeating number of polyethylene glycol by centrifuging the ink, collecting its supernatant, drying the supernatant, dissolving a residue in deuterated DMSO and measuring using the carbon nuclear magnetic resonance method ($^{13}$C-NMR).

<Water>

The ink in the present exemplary embodiment can contain water. It is desirable to use deionized water (ion exchanged water) as the water. The content (% by mass) of the water in the ink is desirably 50.0% by mass or more and 95.0% by mass or less based on the total mass of the ink.

<Other Ingredients>

Various additives such as surfactants, pH adjusters, anti-corrosion agents, preservatives, antimicrobial agents, antioxidants, anti-reduction agents, evaporation accelerators, chelating agents, and polymers other than the above polyurethane polymer may be contained in the ink of the present exemplary embodiment as needed.

[Ink Cartridge]

The ink cartridge of the present exemplary embodiment has an ink storage portion in which the ink is stored, and stores the ink of the present exemplary embodiment described above in the ink storage portion. In the ink cartridge, the ink storage portion is composed of an ink storage room in which a liquid ink is stored and a negative pressure generation member storage room in which a negative pressure generation member that retains the ink inside thereof with negative pressure is stored. The ink cartridge may be an ink cartridge retaining a total amount of a storage amount with the negative pressure generation member without having the ink storage room in which the liquid ink is stored. Further, the ink cartridge may be an ink cartridge configured to have the ink storage room and the recording head.

[Inkjet Recording Method]

The inkjet recording method of the present exemplary embodiment is an inkjet recording method in which the ink is discharged from the recording head by giving thermal energy to the ink, and the ink of the present exemplary embodiment described above is used. The "recording" in the present exemplary embodiment includes aspects of recording on a recording medium using the ink of the present exemplary embodiment and aspects of printing on a non-permeable substrate such as a glass, a plastic and a film using the ink of the present exemplary embodiment. The recording medium includes plain papers and so-called gloss papers comprising a porous ink receiving layer containing an inorganic pigment and a binder on an air-permeable support (paper and the like). In the present exemplary embodiment, when the ink of the present exemplary embodiment is used on the plain paper, the effect of the present invention is exerted particularly, which is thus desirable.

Figure 1:
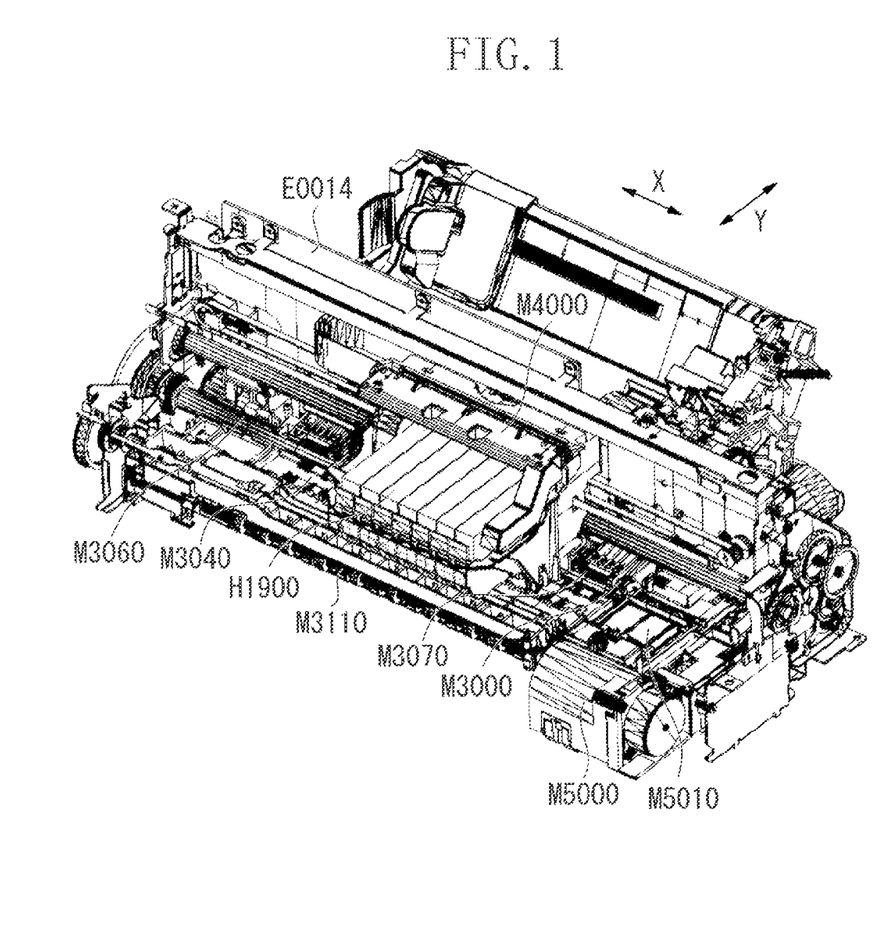
FIG. 1 is a perspective view illustrating a machinery section of an inkjet recording apparatus.

FIG. 1 is a perspective view illustrating a machinery section of the inkjet recording apparatus. When the paper is supplied, first predetermined sheets of the recording medium in a paper supply section including a paper supply tray are fed to a nip portion composed of a paper supply roller and a separation roller. The recording media are separated at the nip portion, and only the recording medium located on a topmost is fed. The recording medium sent to a feeding section is guided by a pinch roller holder M3000 and a paper guide flapper and sent to a roller pair of a feeding roller M3060 and a pinch roller M3070. The roller pair composed of the feeding roller M3060 and the pinch roller M3070 is rotated by driving a line feed (LF) motor, and the recording medium is fed on a platen M3040 by this rotation.

When an image is formed, a carriage section arranges the recording head in a target position for image formation, and discharges the ink on the recording medium according to signals from an electric substrate. In the inkjet recording apparatus, the image is formed on the recording medium by alternately repeating a main scanning in which the carriage M4000 scans in a column direction while the recording is performed by the recording head and a vertical scanning in which the recording medium is fed in a row direction by the feeding roller M3060. Finally, the recording medium on which the image has been formed is inserted into a nip of a first paper discharging roller M3110 and a spur, fed and discharged onto a paper discharge tray.

Figure 2:
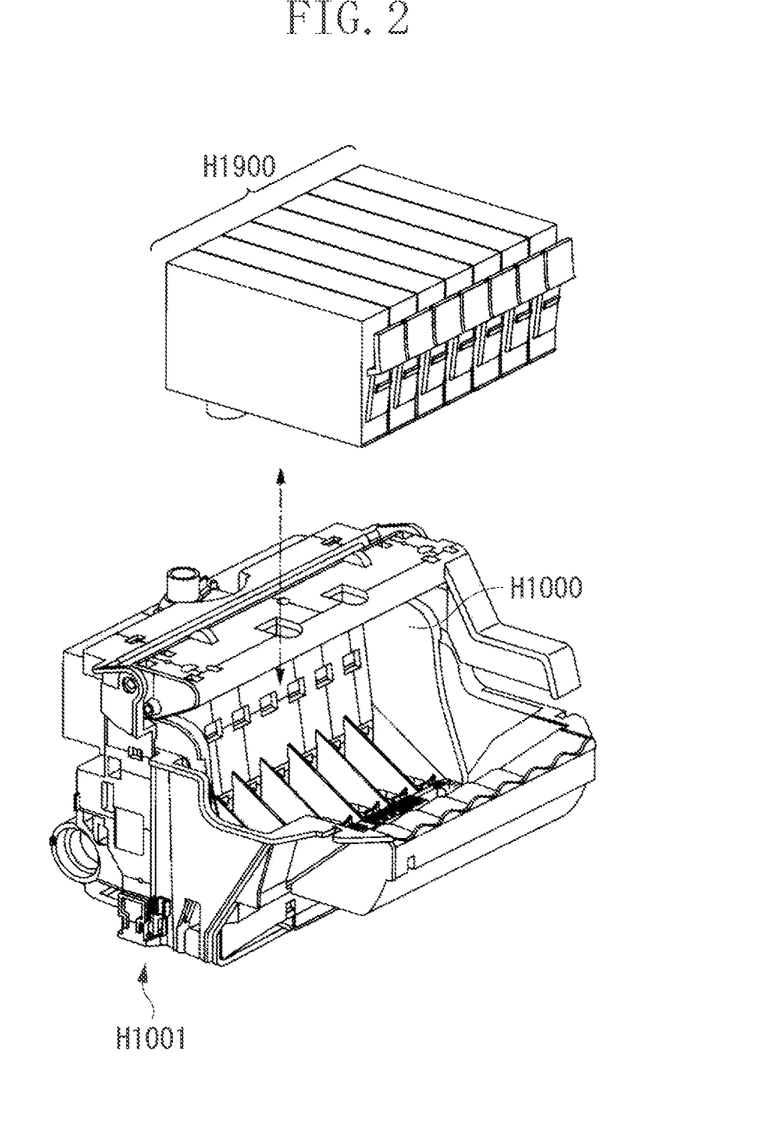
FIG. 2 is a perspective view illustrating a state where an ink cartridge is mounted in a head cartridge.

FIG. 2 is a perspective view illustrating a state where an ink cartridge H1900 is mounted in a head cartridge H1000. The inkjet recording apparatus of the present exemplary embodiment forms an image by respective yellow, magenta, cyan, black, light magenta, light cyan, and green inks. Therefore, the ink cartridge H1900 is independently prepared for seven colors. In above, the ink of the present exemplary embodiment is used as at least one ink. As illustrated in FIG. 2, each ink cartridge H1900 is freely removable from the head cartridge H1000. The ink cartridge H1900 can be attached and removed in the state where the head cartridge H1000 has been mounted in the carriage M5000.

The present invention will be described in detail below with reference to Examples and Comparative Examples. The present invention is not restricted to the following Examples in the range within the scope thereof. In the description in the following Examples, a "part" is based on the mass unless otherwise indicated.

<Preparation of Polyurethane Polymer Dispersion>

Polyol (B part) was thoroughly stirred and dissolved in methyl ethyl ketone, then polyisocyanate (A part) and diol having an acid group (C part) were added thereto, and the mixture was reacted at 75° C. for one hour to obtain a urethane prepolymer solution. Then, the obtained urethane prepolymer solution was cooled to 60° C., an aqueous solution of potassium hydroxide was added to neutralize a carboxyl group, and subsequently the mixture was cooled to 40° C. Ion exchange water was added thereto, and the mixture was emulsified by stirring at high speed using a homomixer. After the emulsification, a chain extender (D part) was added, and a chain extension reaction was carried out at 30° C. for 12 hours. When the presence of an isocyanate group was not identified by FT-IR, methyl ethyl ketone was distilled off from this polymer solution by heating under reduced pressure to yield a polyurethane polymer dispersion in which a content of a polyurethane polymer was 20.0% and a weight average molecular weight was 30,000. Using the obtained polyurethane polymer dispersion, an acid value of the polyurethane polymer was determined by potential difference titration using a potassium hydroxide methanol titration solution. A preparation condition and a characteristic of each polyurethane polymer dispersion are shown in Table 2. Abbreviations in Table are as follows.

IPDI: Isophorone diisocyanate
PPG: Polypropylene glycol (number average molecular weight: 2,000)
PTMG: Polytetramethylene glycol (number average molecular weight: 2,000)
PC: Polycarbonate polyol (number average molecular weight: 2,000)
PES: Polyester polyol (number average molecular weight: 2,000)
DMPA: Dimethylol propionate
EDA: Ethylenediamine

TABLE 2

Preparation conditions and characteristics of polyurethane polymer dispersions

| Polyurethane polymer dispersion | Preparation condition | | | | | |
|---|---|---|---|---|---|---|
| | Polyisocyanate | | Polyol | | Diol having acid group | |
| No. | Type | A part | Type | B part | Type | C part |
| PU-1 | IPDI | 27.5 | PC | 61.7 | DMPA | 9.6 |
| PU-2 | IPDI | 27.5 | PES | 61.7 | DMPA | 9.6 |
| PU-3 | IPDI | 27.5 | PTMG | 61.7 | DMPA | 9.6 |
| PU-4 | IPDI | 27.5 | PPG | 61.7 | DMPA | 9.6 |
| PU-5 | IPDI | 46.9 | PPG | 31.6 | DMPA | 21.5 |
| PU-6 | IPDI | 61.5 | PPG | 5.0 | DMPA | 33.5 |
| PU-7 | IPDI | 24.2 | PPG | 67.4 | DMPA | 9.6 |

| Polyurethane polymer dispersion | Preparation condition Chain extender | | Characteristic Acid value |
|---|---|---|---|
| No. | Type | D part | (mg KOH/g) |
| PU-1 | EDA | 1.3 | 40.0 |
| PU-2 | EDA | 1.3 | 40.0 |
| PU-3 | EDA | 1.3 | 40.0 |
| PU-4 | EDA | 1.3 | 40.0 |
| PU-5 | EDA | 2.1 | 90.0 |
| PU-6 | EDA | 1.5 | 140.0 |
| PU-7 | EDA | 1.3 | 30.0 |

<Preparation of Pigment Dispersion 1>

20 g of Black Pearls 880 (manufactured by Cabot) having a specific surface area of 220 m²/g, 11.0 mmol of ((4-aminobenzoylamino)-methane-1,1-diyl)bisphosphonate sodium salt, 20.0 mmol of nitric acid, and 200 mL of pure water were mixed at room temperature using a Silverson mixer at 6,000 rpm. After 30 minutes, a solution in which 20.0 mmol of sodium nitrite had been dissolved in water in a small amount was added to this mixture, and the mixture was further mixed. When a temperature reached 60° C. by the addition and the mixing, the mixture was mixed in this state for one hour to obtain a self-dispersing carbon black dispersion. Subsequently, pH was adjusted to 10.0 with an aqueous solution of potassium hydroxide. After 30 minutes, the modified carbon black dispersion was ultrafiltrated using 20 parts of pure water. Further, water was added to the obtained self-dispersing carbon black to disperse so that the content of the pigment was 10.0% by mass to prepare a dispersion. A pigment dispersion 1 in which the self-dispersing carbon black, particle surfaces of which a bisphosphonate group, a counter ion of which is potassium, was bound to via an atomic group including —$C_6H_4$—CONH— (benzamide structure) was dispersed in water was obtained by the aforementioned method. A surface charge amount of the self-dispersing carbon black was measured by the aforementioned method, and was 0.38 mmol/g. In the pigment dispersion prepared above, the content of the pigment was 10.0% by mass, pH was 10.0, and an average particle diameter of the pigment was 120 nm.

<Preparation of Pigment Dispersion 2>

To a solution in which 5 g of a concentrated hydrochloric acid was dissolved in 5.5 g of water, 6 g of Black Pearls 880 (manufactured by Cabot) having a specific surface area of 220 m²/g and 1.5 g of 4-aminophthalic acid were added at 5° C., and the mixture was mixed at room temperature using the Silverson mixer at 6,000 rpm. After 30 minutes, a solution in which 20.0 mmol of sodium nitrite had been dissolved in water in a small amount was added to this mixture, and the mixture was further mixed. When the temperature reached 60° C. by the addition and the mixing, the mixture was mixed in this state for one hour to obtain a self-dispersing carbon black dispersion. Subsequently, pH was adjusted to 10.0 with the aqueous solution of potassium hydroxide. After 30 minutes, the modified carbon black dispersion was ultrafiltrated using 20 parts of pure water. Further, water was added to the obtained self-dispersing carbon black to disperse so that the content of the pigment was 10.0% by mass to prepare a dispersion. A pigment dispersion 2 in which the self-dispersing carbon black, particle surfaces of which a phthalate group, a counter ion of which was potassium was bound to via an atomic group was dispersed in water was obtained by the aforementioned method. The surface charge amount of the self-dispersing carbon black was measured by the aforementioned method, and was 0.41 mmol/g. In the pigment dispersion prepared above, the content of the pigment was 10.0% by mass, pH was 10.0, and an average particle diameter of the pigment was 110 nm.

<Preparation of Acryl Polymer Aqueous Solution>

An acid group in an acryl polymer (random copolymer) having the composition and the characteristics shown in Table 3 was neutralized using an aqueous solution of 10.0% by mass sodium hydroxide, and further water was added thereto to prepare an aqueous solution of the acryl polymer, a content of which was 10.0% by mass. The acid value and the weight average molecular weight of the acryl polymer were measured by the above measurement methods.

TABLE 3

Composition and characteristics of acryl polymers

| Acryl polymer aqueous solution | Composition (% by mass) | | | | | Acid Value (mg KOH/g) | Weight average molecular weight |
|---|---|---|---|---|---|---|---|
| No. | Styrene | BA*¹ | BM*² | MA*³ | AA*⁴ | | |
| AC-1 | 67.0 | 20.0 | — | — | 13.0 | 100 | 10000 |
| AC-2 | 36.0 | — | 38.0 | — | 26.0 | 200 | 10000 |

TABLE 3-continued

Composition and characteristics of acryl polymers

| Acryl polymer aqueous solution No. | Composition (% by mass) | | | | | Acid Value (mg KOH/g) | Weight average molecular weight |
|---|---|---|---|---|---|---|---|
| | Styrene | BA*1 | BM*2 | MA*3 | AA*4 | | |
| AC-3 | 60.0 | 26.0 | — | 14.0 | — | 90 | 10000 |
| AC-4 | — | 22.0 | 51.0 | — | 27.0 | 210 | 10000 |

*1 Butyl acrylate
*2 Benzyl methacrylate
*3 Methacrylic acid
*4 Acrylic acid

<Preparation of Ink>

Respective ingredients in Table 4 were mixed, thoroughly stirred and dispersed, and then filtrated through a microfilter having a pore size of 3.0 μm (manufactured by FUJIFILM Corporation) with pressure to prepare each ink. In the table, PEG1000 is polyethylene glycol having the number average molecular weight of 1,000 and acetylenol E100 is a surfactant manufactured by Kawaken Fine Chemicals Co., Ltd.

TABLE 4

Condition for preparing ink

| Ink No. | Pigment dispersion | | Polyurethane polymer dispersion | | Acryl polymer aqueous solution | | Glycerine (% by mass) |
|---|---|---|---|---|---|---|---|
| | Type | Content | Type | Content | Type | Content | |
| Ink 1 | PD 1 | 30.0 | PU-1 | 6.0 | AC-1 | 6.0 | 9.0 |
| Ink 2 | PD-1 | 30.0 | PU-2 | 6.0 | AC-1 | 6.0 | 9.0 |
| Ink 3 | PD-1 | 30.0 | PU-3 | 6.0 | AC-1 | 6.0 | 9.0 |
| Ink 4 | PD-1 | 30.0 | PU-4 | 7.5 | AC-1 | 6.0 | 9.0 |
| Ink 5 | PD-1 | 30.0 | PU-4 | 7.5 | AC-2 | 6.0 | 9.0 |
| Ink 6 | PD-1 | 30.0 | PU-5 | 7.5 | AC-1 | 6.0 | 9.0 |
| Ink 7 | PD-1 | 30.0 | PU-6 | 7.5 | AC-1 | 6.0 | 9.0 |
| Ink 8 | PD-1 | 30.0 | PU-4 | 6.0 | AC-1 | 4.8 | 9.0 |
| Ink 9 | PD-1 | 30.0 | PU-4 | 2.4 | AC-1 | 10.0 | 9.0 |
| Ink 10 | PD-1 | 30.0 | PU-4 | 2.5 | AC-1 | 10.0 | 9.0 |
| Ink 11 | PD-1 | 30.0 | PU-4 | 6.0 | AC-1 | 6.0 | 9.0 |
| Ink 12 | PD-1 | 30.0 | PU-4 | 6.0 | AC-1 | 24.0 | 9.0 |
| Ink 13 | PD-1 | 30.0 | PU-4 | 6.0 | AC-1 | 6.0 | 9.0 |
| Ink 14 | PD-1 | 30.0 | PU-4 | 7.5 | AC-1 | 7.5 | 9.0 |
| Ink 15 | PD-1 | 30.0 | PU-7 | 7.5 | AC-1 | 6.0 | 9.0 |
| Ink 16 | PD-1 | 30.0 | PU-4 | 7.5 | AC-3 | 6.0 | 9.0 |
| Ink 17 | PD-1 | 30.0 | PU-4 | 7.5 | AC-4 | 6.0 | 9.0 |
| Ink 18 | PD-1 | 30.0 | — | 0 | AC-1 | 6.0 | 9.0 |
| Ink 19 | PD-2 | 30.0 | PU-4 | 7.5 | AC-1 | 6.0 | 9.0 |

| Ink No. | Diethylene glycol (% by mass) | Triethylene glycol (% by mass) | PEG 1000 (% by mass) | Acetylenol (% by mass) | Ion exchange water (% by mass) |
|---|---|---|---|---|---|
| Ink 1 | 5.0 | 5.0 | 0 | 0.2 | 388 |
| Ink 2 | 5.0 | 5.0 | 0 | 0.2 | 388 |
| Ink 3 | 5.0 | 5.0 | 0 | 0.2 | 388 |
| Ink 4 | 5.0 | 5.0 | 0 | 0.2 | 373 |
| Ink 5 | 5.0 | 5.0 | 0 | 0.2 | 373 |
| Ink 6 | 5.0 | 5.0 | 0 | 0.2 | 373 |
| Ink 7 | 5.0 | 5.0 | 0 | 0.2 | 373 |
| Ink 8 | 5.0 | 5.0 | 0 | 0.2 | 400 |
| Ink 9 | 5.0 | 5.0 | 0 | 0.2 | 384 |
| Ink 10 | 5.0 | 5.0 | 0 | 0.2 | 383 |
| Ink 11 | 5.0 | 5.0 | 0 | 0.2 | 388 |
| Ink 12 | 5.0 | 5.0 | 0 | 0.2 | 208 |
| Ink 13 | 5.0 | 5.0 | 0.2 | 0.2 | 386 |
| Ink 14 | 5.0 | 5.0 | 0 | 0.2 | 358 |
| Ink 15 | 5.0 | 5.0 | 0 | 0.2 | 373 |
| Ink 16 | 5.0 | 5.0 | 0 | 0.2 | 373 |
| Ink 17 | 5.0 | 5.0 | 0 | 0.2 | 373 |
| Ink 18 | 5.0 | 5.0 | 0 | 0.2 | 448 |
| Ink 19 | 5.0 | 5.0 | 0 | 0.2 | 373 |

<Evaluation>

In the present exemplary embodiment, desirable levels were represented by AA to B, and unacceptable levels were represented by C and D in evaluation criteria in following each evaluation parameter. The following each evaluation was carried out using an inkjet recording apparatus PIXUS ip3100 (manufactured by Canon Inc.). A condition for recording was as follows; temperature: 23° C., relative humidity: 55%, and discharged amount per droplet: 28 ng (within ±10%). In this inkjet recording apparatus, a recording duty was defined to be 100% on an image recorded under a condition where one drop of about 28 ng ink was given on a unit area of 1/600 inch×1/600 inch with a resolution of 600 dpi×600 dpi.

(Discharge Stability of Ink)

An ink cartridge was filled with each ink obtained above, and mounted in the inkjet recording apparatus modified so that a moving speed of a carriage was 40 inches/seconds. Then, an image of vertical ruled lines formed with 4 dots was recorded on PPC paper CF-500 (manufactured by Canon Inc.) (image before a discharge test). Then, a solid image of 19 cm×26 cm (image with a recording duty of 100%) was recorded on 10 sheets of the paper, and subsequently, the image of the vertical ruled lines formed with 4 dots was recorded (image after a first discharge test). Further, after the same discharge test was carried out, the image of the vertical ruled lines formed with 4 dots was recorded (image after a second discharge test). The discharge stability of the ink was evaluated by measuring raggedness of the vertical ruled lines using a personal image quality evaluation system, Personal IAS (manufactured by Quality Engineering Associates) and further visually observing the image of the vertical rules lines on the images before and after the first discharge test and the images before and after the second discharge test. The smaller the difference between raggedness values of the vertical ruled lines before and after the discharge test is, it is evaluated that the higher the discharge stability of the ink is. Evaluation criteria for the discharge stability of the ink are as follows. Evaluation results are shown in Table 5.

AA: The difference between the raggedness values before and after the discharge test was less than 2, and no change was observed at all on the images of the vertical ruled lines.

A: The difference between the raggedness values before and after the discharge test was 2 or more and less than 4, and the change on the images of the vertical ruled lines was not identified.

B: The difference between the raggedness values before and after the discharge test was 4 or more and less than 6, and the image of the vertical ruled lines was slightly changed.

C: The difference between the raggedness values before and after the discharge test was 6 or more, and the image of the vertical ruled lines was obviously changed.

D: White stripes and faint print were observed on the solid image in the discharge test.

(Highlighter Resistance on Image)

The ink cartridge was filled with each ink obtained above, and mounted in the inkjet recording apparatus. A vertical ruled line with a thickness of 1/10 inch was recorded on PPC paper GF-500 (manufactured by Canon Inc.). Five minutes and one day after the recording, a marking was given onto the recorded vertical rules line using a yellow line marker OPTEX2 (manufactured by ZEBRA Co., Ltd.) and immediately after that, the marking was given to a white part on the recording medium using the same marker. Then, contamination of a marker tip and contamination of the marking on the white part were identified. Evaluation criteria for the highlighter resistance on the image are as follows. Evaluation results are shown in Table 5.

A: After 5 minutes, the contamination of the marker tip with coloration was observed, but the contamination was scarcely observed when the marking was given to the white part. After one day, neither contamination of the marker tip with the coloration nor contamination when the marking was given to the white part was observed.

B: After 5 minutes and after one day, the marker tip was slightly contaminated with the coloration, but the contamination was scarcely observed when the marking was given to the white part.

TABLE 5

Evaluation results

| Example No. | Ink No. | Content of polyurethane polymer/content of pigment in ink (times) | Content of acryl polymer/content of polyurethane polymer in ink (times) |
|---|---|---|---|
| Example 1 | Ink 1 | 0.4 | 0.5 |
| Example 2 | Ink 2 | 0.4 | 0.5 |
| Example 3 | Ink 3 | 0.4 | 0.5 |
| Example 4 | Ink 4 | 0.5 | 0.4 |
| Example 5 | Ink 5 | 0.5 | 0.4 |
| Example 6 | Ink 6 | 0.5 | 0.4 |
| Example 7 | Ink 7 | 0.5 | 0.4 |
| Example 8 | Ink 8 | 0.4 | 0.4 |
| Example 9 | Ink 9 | 0.4 | 2.1 |
| Example 10 | Ink 10 | 0.4 | 2.0 |
| Example 11 | Ink 11 | 0.4 | 0.5 |
| Example 12 | Ink 12 | 0.4 | 2.0 |
| Example 13 | Ink 13 | 0.4 | 0.5 |
| Example 14 | Ink 14 | 0.5 | 0.5 |
| Example 15 | Ink 19 | 0.5 | 0.4 |
| Comparative Example 1 | Ink 15 | 0.5 | 0.4 |
| Comparative Example 2 | Ink 16 | 0.5 | 0.4 |
| Comparative Example 3 | Ink 17 | 0.5 | 0.4 |

| Example No. | Ink No. | Comparison of image before & after 1st discharge test | Comparison of image before & after 2nd discharge test | Highlighter resistance on image |
|---|---|---|---|---|
| Example 1 | Ink 1 | AA | A | B |
| Example 2 | Ink 2 | AA | A | B |
| Example 3 | Ink 3 | AA | A | A |
| Example 4 | Ink 4 | A | A | A |
| Example 5 | Ink 5 | A | A | A |
| Example 6 | Ink 6 | A | A | A |
| Example 7 | Ink 7 | A | A | A |
| Example 8 | Ink 8 | AA | A | A |
| Example 9 | Ink 9 | AA | A | B |
| Example 10 | Ink 10 | AA | AA | A |
| Example 11 | Ink 11 | AA | AA | A |
| Example 12 | Ink 12 | AA | AA | A |
| Example 13 | Ink 13 | AA | AA | A |
| Example 14 | Ink 14 | A | A | A |
| Example 15 | Ink 19 | A | A | A |
| Comparative Example 1 | Ink 15 | D | D | B |
| Comparative Example 2 | Ink 16 | B | C | A |
| Comparative Example 3 | Ink 17 | B | C | A |

A heater surface of the recording head after discharging the ink after the above second discharge test (for the discharge stability of the ink) was observed under an optical microscope. Comparing Example 11 and Example 13, no burnt deposit was observed at all in Example 13 whereas the burnt deposit was slightly observed in Example 11. Comparing Example 5 and Example 14, an amount of the burnt deposit was slightly smaller in Example 14 than in Example 5. Comparing Examples 1 and 2 with Examples 3, 8 and 9, the amount of the burnt deposit was slightly smaller in Examples 3, 8 and 9 than in Examples 1 and 2.

The ink 18 prepared above by the present inventors was evaluated in the same manner as in the first discharge test (for the discharge stability of the ink), and the evaluation A was given.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-107781 filed May 9, 2012, which is hereby incorporated by reference herein in its entirety.

What is claimed is:

1. A method for inhibiting burnt deposit on an inkjet recording head comprising a step of discharging an ink by an action of thermal energy from the recording head,
   wherein the ink contains self-dispersing carbon black, a polyurethane polymer, and an acryl polymer,
   wherein the self-dispersing carbon black is at least one of a (i) carbon black in which a phthalic acid group is bonded to the surface of the carbon black, and (ii) a carbon black in which $-C_6H_4-CONH-CH(PO_3M_2)_2$ group (M represents a hydrogen atom, an alkali metal, ammonium, or organic ammonium) is bonded to the surface of the carbon black,
   wherein an acid value of the polyurethane polymer is 40 mg KOH/g or more, and
   wherein an acid value of the acryl polymer is 100 mg KOH/g or more to 200 mg KOH/g or less.

2. The method according to claim 1, wherein the polyurethane polymer has units each derived from polyisocyanate, polyether polyol, and diol having an acid group.

3. The method according to claim 2, wherein the polyether polyol is polypropylene glycol.

4. The method according to claim 1, wherein a content (% by mass) of the polyurethane polymer is 0.4 times or less as a mass ratio relative to a content (% by mass) of the self-dispersing carbon black based on a total mass of the ink.

5. The method according to claim 1, wherein a content (% by mass) of the acryl polymer is 0.5 times or more to 2.0 times or less relative to a content (% by mass) of the polyurethane polymer based on a total mass of the ink.

6. The method according to claim 1, further containing polyethylene glycol having a number average molecular weight of 500 or more to 3,000 or less.

7. The method according to claim 1,
wherein the self-dispersing carbon black is the carbon black in which a hydrophilic group is bound to the surface of the carbon black directly or via another atomic group having a molecular weight of 1,000 or less.

8. The method according to claim 1,
wherein a weight average molecular weight of the acryl polymer is 3,000 or more to 10,000 or less.

9. The method according to claim 1,
wherein a weight average molecular weight of the polyurethane polymer is 30,000 or more to 150,000 or less.

10. The method according to claim 1,
wherein a weight average molecular weight of the polyurethane polymer is more than 30,000 to 150,000 or less.

11. The method according to claim 1,
wherein a content (% by mass) of the self-dispersing carbon black in the ink is 0.1% by mass or more to 15.0% by mass or less based on the total mass of the ink.

12. The method according to claim 1,
wherein a content (% by mass) of the polyurethane polymer is 0.1% by mass or more to 10.0% by mass or less based on a total mass of the ink.

13. The method according to claim 1,
wherein a content (% by mass) of the acryl polymer is 0.5% by weight or to and 3.0% by mass or less based on a total mass of the ink.

14. The method according to claim 5,
wherein a content (% by mass) of the polyurethane polymer is 0.1 times or more as a mass ratio relative to a content (% by mass) of the self-dispersing carbon black based on a total mass of the ink.

15. The method according to claim 1,
wherein a content (% by mass) of the polyurethane polymer is 0.05 times or more to 2.00 times or less as a mass ratio relative to a content (% by mass) of the self-dispersing carbon black based on a total mass of the ink.

16. The method according to claim 6,
wherein a content (% by mass) of polyethylene glycol in the ink is 0.1 time or more to 2.0 times or less as the mass ratio relative to a content (% by mass) of the polyurethane polymer based on the total mass of the ink.

17. The method according to claim 1,
wherein the acid value of the polyurethane polymer is 140 mg KOH/g or less.

18. The method according to claim 7,
wherein the hydrophilic group is at least one selected from the group consisting of COOM, $SO_3M$, $PO_3HM$, $PO_3M_2$ and $SO_2NH_2$ (M represents a hydrogen atom, an alkali metal, ammonium, or organic ammonium).

19. The method according to claim 7,
wherein the another atomic group is at least one selected from the group consisting of an amide group, an amino group, a ketone group, an ester group, an ether group, an alkylene group having 1 to 12 carbon atoms, a substituted or unsubstituted phenylene group, and a substituted or unsubstituted naphthylene group.

* * * * *